United States Patent
Jansohn et al.

(10) Patent No.: US 6,966,745 B2
(45) Date of Patent: Nov. 22, 2005

(54) METHOD FOR INTERMEDIATE COOLING AND GAS TURBINE SYSTEM WITH INTERMEDIATE COOLING

(75) Inventors: Peter Jansohn, Kuessaberg (DE); Alexander Ni, Baden (CH); Sasha Savic, Wettingen (CH)

(73) Assignee: ALSTOM Technology Ltd., Baden (CH)

(*) Notice: Subject to any disclaimer, the term of this patent is extended or adjusted under 35 U.S.C. 154(b) by 0 days.

(21) Appl. No.: 10/465,230

(22) Filed: Jun. 20, 2003

(65) Prior Publication Data

US 2004/0031269 A1 Feb. 19, 2004

(30) Foreign Application Priority Data

Jun. 28, 2002 (DE) .......................... 102 28 986

(51) Int. Cl.⁷ .......................... F01D 25/12; F02C 7/143
(52) U.S. Cl. .......................... 415/1; 415/179; 60/728; 60/775
(58) Field of Search .......................... 415/1, 116, 117, 415/179; 60/728, 772, 775, 39.53

(56) References Cited

U.S. PATENT DOCUMENTS

| | | | | | |
|---|---|---|---|---|---|
| 2,115,338 A | * | 4/1938 | Lysholm | ...................... | 60/775 |
| 2,186,706 A | * | 1/1940 | Martinka | ...................... | 60/775 |
| 2,407,165 A | * | 9/1946 | Kreitner et al. | ............ | 60/39.53 |
| 2,584,232 A | * | 2/1952 | Sedille | ........................ | 60/728 |
| 2,678,531 A | | 5/1954 | Miller | | |
| 5,553,448 A | * | 9/1996 | Farrell et al. | .................. | 60/728 |
| 6,378,284 B1 | * | 4/2002 | Utamura | ...................... | 60/775 |

FOREIGN PATENT DOCUMENTS

| | | |
|---|---|---|
| DE | 29 25 091 | 1/1981 |
| EP | 0 516 995 A1 | 12/1992 |
| EP | 0 770 771 A1 | 5/1997 |
| EP | 0 903 483 | 3/1999 |
| WO | 00/60226 | 10/2000 |

* cited by examiner

*Primary Examiner*—Christopher Verdier

(74) *Attorney, Agent, or Firm*—Cermak & Kenealy, LLP; Adam J. Cermak

(57) ABSTRACT

In a method and a device for intermediate cooling during compression in a gas turbine system, the gas turbine system includes at least one first (1) and one second compressor (2), a combustion chamber (3), and a turbine (4). At least one intermediate cooler (9) is located between the first (1) and second compressor (2). The intermediate cooling takes place at least in part or for the most part isentropically.

10 Claims, 6 Drawing Sheets

METHOD FOR INTERMEDIATE COOLING AND GAS TURBINE SYSTEM WITH INTERMEDIATE COOLING

FIELD OF TECHNOLOGY

The invention is based on a method for intermediate cooling according to the preamble of the first claim.

The invention furthermore relates to a gas turbine system with intermediate cooling according to the preamble of the independent device claim.

STATE OF THE ART

EP 0 516 995 A1 has disclosed a gas turbine system, wherein an intermediate cooling and intermediate heating are provided in order to maximize efficiency. For this purpose, the gas turbine system consists of two compressors, two combustion chambers, and two turbines. The intermediate cooler is positioned between the first compressor and the second compressor. In the intermediate cooler, the air compressed in the first compressor is cooled, and the excess heat is released to the water. The cooled, compressed air is then further compressed in the second compressor. As a result of the intermediate cooling, the efficiency is increased because the work required for compressing the air in the second compressor is reduced.

EP 0 770 771 A1 discloses an intermediately cooled compressor wherein water is injected into the compressor stages for cooling. An intermediate cooler is positioned between the first and second compressor stage for further cooling.

DESCRIPTION OF THE INVENTION

The invention is based on the objective of improving the intermediate cooling in a method and a device for intermediate cooling of the initially mentioned type, and on achieving a high efficiency of the gas turbine system.

According to the invention, this is accomplished with the characteristics of the first claim.

Accordingly, the core of the invention is that the intermediate cooling takes place at least in part or mostly isentropically.

The advantage of the invention includes, among others, that the total efficiency of the gas turbine system is improved by the at least partial isentropic intermediate cooling. This improvement becomes higher, the closer one comes to a completely isentropic intermediate cooling. The improved efficiency improves the environmental balance of the gas turbine system, since in comparison with the energy gained much fewer noxious substances are produced.

Other advantageous embodiments and advantages of the invention are derived from the secondary claims and from the specification.

BRIEF DESCRIPTION OF DRAWING

A more detailed description of exemplary embodiments of the invention in reference to the drawings follows. Identical elements have been labeled with the same reference numbers in the different figures. The flow direction of the media is shown by means of arrows.

Hereby.

Only those elements essential for directly understanding the invention are shown and described.

WAY OF EXECUTING THE INVENTION

Figure 1:
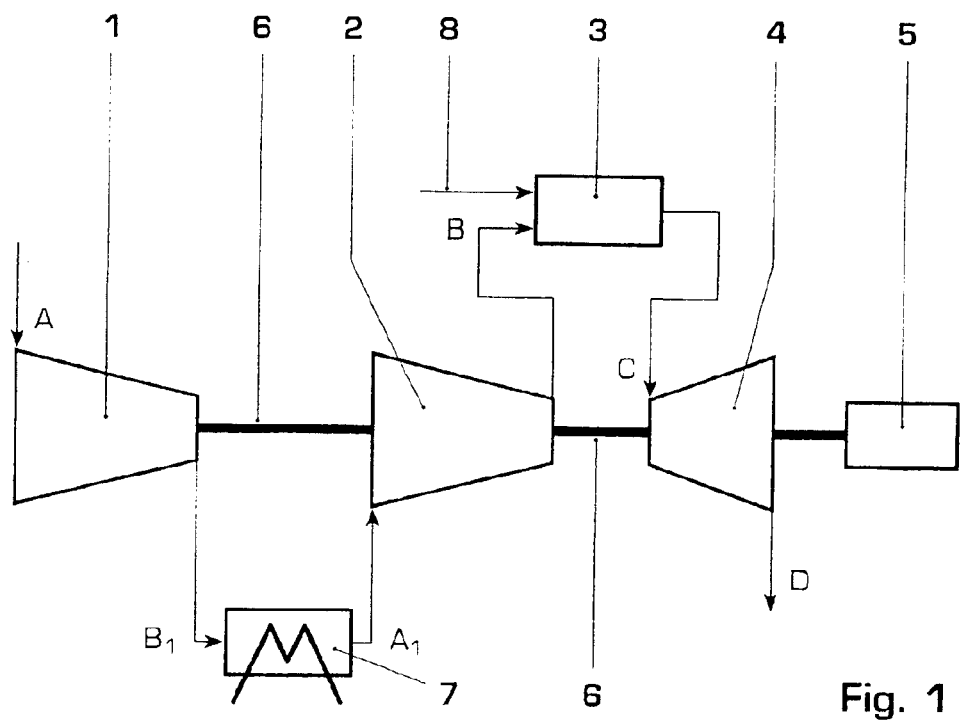
FIG. 1 shows a gas turbine system with intermediate cooler according to the state of the art.

FIG. 1 shows an actually known gas turbine system comprising a first compressor 1, a second compressor 2, a combustion chamber 3, a turbine 4, and a generator 5 coupled with said turbine. Turbo machines 1, 2, and 4 and the generator 5 are coupled via a shaft 6, whereby appropriate gears may be connected between them. Air is taken in by compressor 1, is compressed and fed into an intermediate cooler 7. In the intermediate cooler, the air heated by compression in the first compressor 1 is cooled and is then fed to the second compressor 2 and further compressed there. The air compressed in this way is then fed into the combustion chamber and burned there with fuel 8. The combustion gases are expanded in the turbine 4, producing work in the process. The work put out by turbine 4 is converted with the generator 5 into electrical energy.

Figure 2:
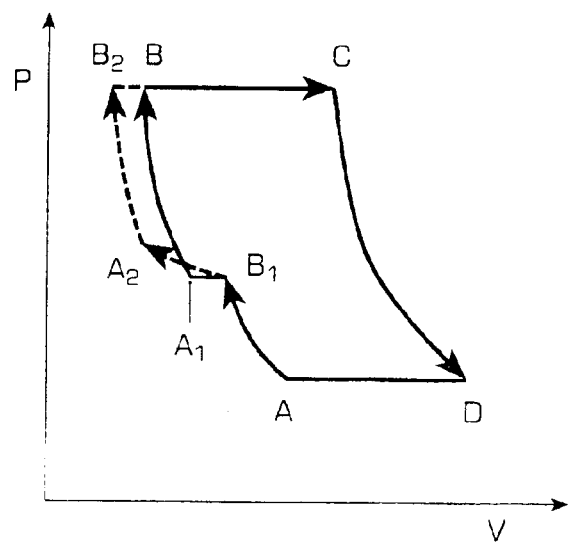
FIG. 2 shows a P-V diagram of a cycle with intermediate cooling.
Figure 3:
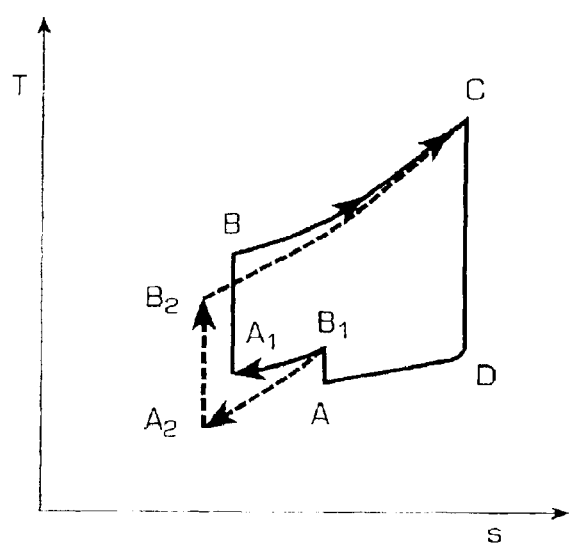
FIG. 3 shows a T-S diagram of a cycle with intermediate cooling.

FIG. 2 shows in a pressure-volume diagram (P-V diagram) and FIG. 3 in a temperature-entropy diagram (T-S diagram) the cycle process (continuous lines) performed according to FIG. 1, whereby S shows the entropy of the ideal gas, and not of a mixed gas or actual gas. These cycle processes shown in the figures in essence correspond to the known cycle process according to Brayton. Thus the idealized assumption is made that the working medium is an ideal gas during the entire cycle process. The combustion process is approximated by adding heat at a constant pressure, and the waste gas, here the heated air, is cooled at a constant pressure and is returned to the compressor.

This means that, when looking at FIGS. 1, 2, and 3 together, an adiabatic compression takes place from A to B1, from B1 to A1 the intermediate cooling at a constant pressure with a heat release, from A1 to B again an adiabatic compression, from B to C an addition of heat at a constant pressure, from C to D an adiabatic expansion, and from D to A a heat release at a constant pressure.

It can therefore be assumed as an approximation of the actual system that the intermediate cooling takes place at a constant pressure. For this purpose, the air heated by compression is cooled in the actual system in the intermediate cooler 7, which may be accomplished in several ways. One usual way is, for example, the injection of small water drops into the heated air; the drops evaporate and cool the air.

However, the total system of air and injected water is much more complex, and the equilibrium state of this mixture system hereby depends on a variety of starting values, such as the size of the water drops, temperature, and speed of the compressed air, etc. However, the cooling effect is the main effect here.

To improve the efficiency of this thermodynamic process of the intermediate cooling, it is now suggested to keep the entropy of the actual system constant. More accurately, this means that the entropy of the mixture system in the intermediate cooling must correspond to the final state of the sum of entropies of the components prior to mixing.

For an ideal system with the above described assumptions, FIGS. 2 and 3 now show an isentropic intermediate cooling from B1 to A2, whereby the term "isentropic intermediate cooling" hereby does not relate to the ideal gas, but to the actual total mixture system with the addition of a cooling medium. The adiabatic compression then takes place in the second compressor, and the heat addition at constant pressure from B2 to C. This means that the area described in FIGS. 2 and 3 by a cycle process with isentropic intermediate cooling is clearly larger than in conventional processes, and so the work performed, and thus the efficiency, of such a gas turbine system is improved.

The conditions that must be maintained in an actual system to achieve an isentropic intermediate cooling now shall be determined using theoretical considerations.

As an approximation, it is assumed for the following calculations that, for the occurring temperature and pressure ranges, air is an ideal gas, water is incompressible, and the latent heat is constant.

The entropy of the ideal gas is $$s = \frac{R}{\gamma - 1} \ln \frac{pV^\gamma}{p_0 V_0^\gamma},$$

whereby the subscript 0 designates reference values.

The enthalpy of water is $$h_w = c_W T + \frac{p}{\rho}.$$

According to the first main theorem of thermodynamics, $dh_w = Vdp + Tds$, this means that $c_w dT = Tds$, and the entropy of water is therefore $$s = c_W \ln \frac{T}{T_0}.$$

The entropy of water after evaporation is $$s = c_W \ln \frac{T}{T_0} + \frac{q}{T},$$

whereby q stands for the latent heat.

The state of constant entropy of the mixture is therefore $$m_g \frac{R}{\gamma - 1} \ln \frac{p_g V_g^\gamma}{p_0 V_0^\gamma} + m_W c_W \ln \frac{T_W}{T_0} = \tag{1}$$

$$m_g \frac{R}{\gamma - 1} \ln \frac{pV^\gamma}{p_0 V_0^\gamma} + m_W c_W \left( c_W \ln \frac{T}{T_0} + \frac{q}{T} \right)$$

Assuming that the system is adiabatic, the enthalpy during the process remains a constant $$m_g c_P T + m_W \left( c_W T + \frac{p}{\rho_W} + q \right) = m_g c_P T_g + m_W \left( c_W T_W + \frac{p_W}{\rho_W} \right)$$

This means that the temperature after the mixing process during the intermediate cooling can be determined according to the following formula:

$$T = \frac{m_g c_P T_g + m_W \left( c_W T_W + \frac{p_W}{\rho_W} - \frac{p}{\rho_W} - q \right)}{m_g c_P + m_W c_W} \tag{2}$$

The mixing parameters for the intermediate cooling in the equilibrium state are therefore described by equations (1) and (2).

FIGS. 4 to 7 show the advantages of an isentropic intermediate cooling resulting from the above described calculations in comparison with known systems. The compression hereby takes place in two stages, the pressure after the first compressor stage is p1. An efficiency of the compressor $\eta_C = 87\%$ and an efficiency of the turbine $\eta_T = 87\%$ was assumed for the calculation.

Figure 4:
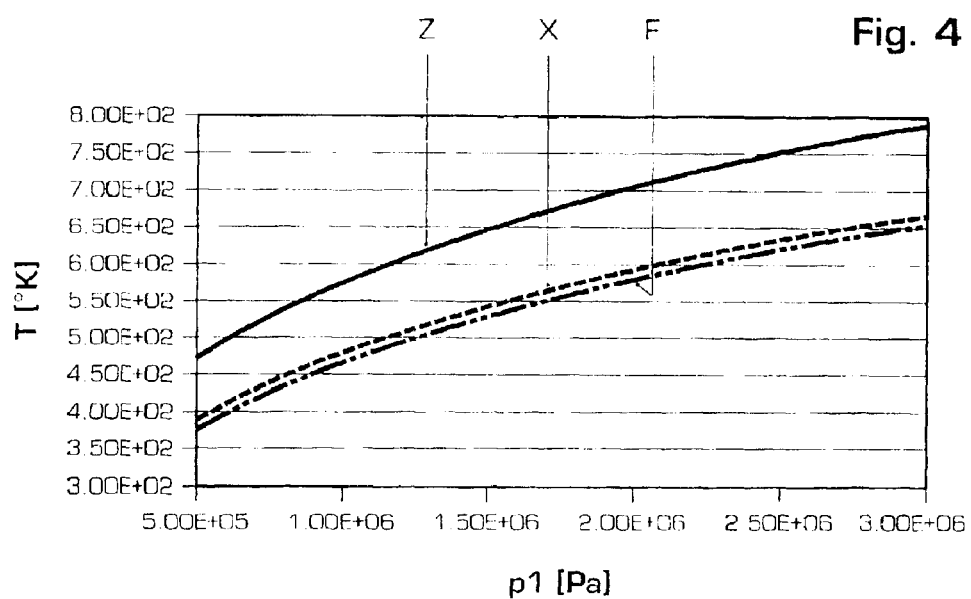
FIG. 4 shows the temperature after the first compressor in comparison with the pressure after the first compressor level in the p-T diagram.

FIG. 4 shows the comparison of the temperatures of a mixture system with intermediate cooling through water addition at a constant pressure and isentropic water cooling after the first compressor. Graphs X and F correspond to a water concentration of 3%.

Figure 5:
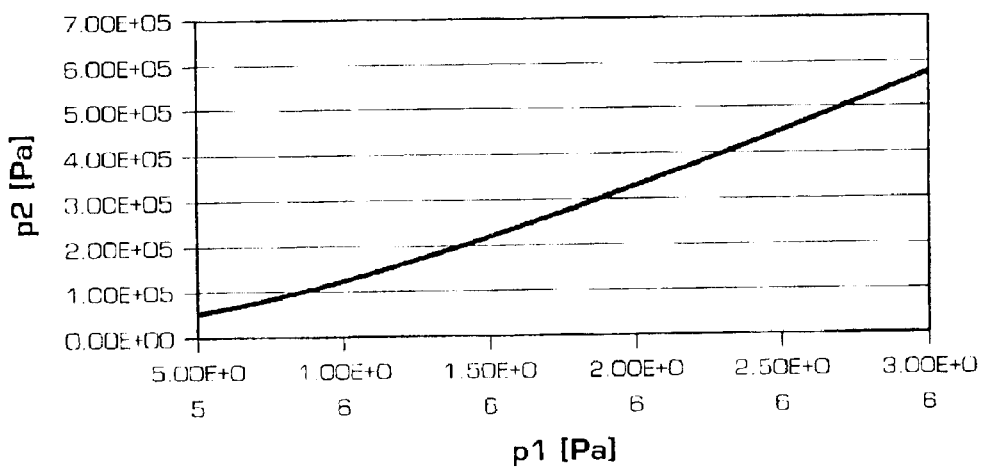
FIG. 5 shows the rise of pressure due to isentropic intermediate cooling.

FIG. 5 shows the dependence of the pressure increase p2 on the basis of the isentropic mixing versus the adiabatic compression p1 in the first compressor; the water concentration is 3%. It becomes clear that the pressure increase as a result of the isentropic compression during the isentropic mixing is relatively high.

Figure 6:
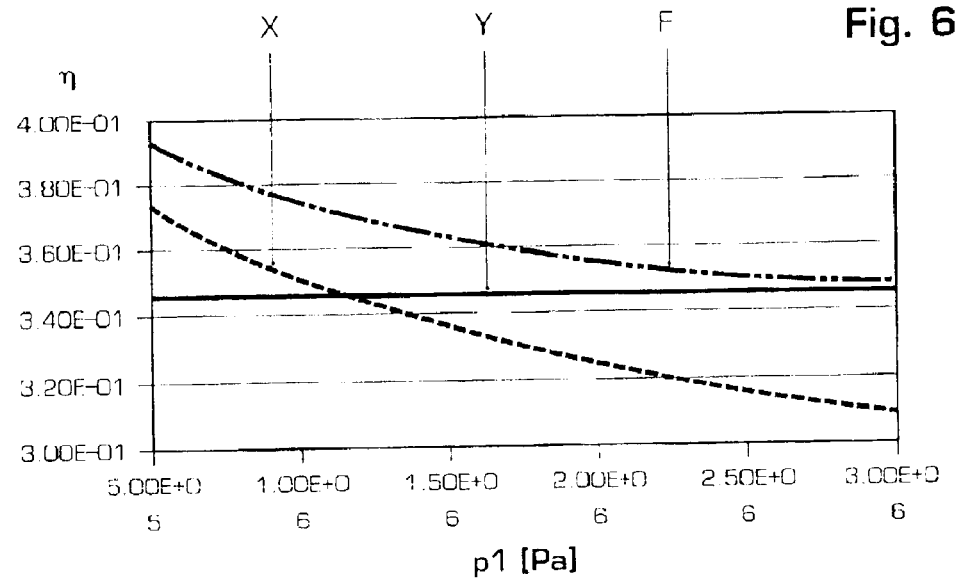
FIG. 6 shows the efficiency of the gas turbine process for different intermediate cooling methods, water concentration of 3%.

FIG. 6 compares the thermodynamic efficiency $\eta$ of the gas turbine cycle process for different intermediate cooling methods. Graph X shows an intermediate cooling at a constant pressure, graph F the isentropic intermediate cooling, and graph Y the Brayton process. The water concentration is 3%. It can be seen that the isentropic intermediate cooling improves the efficiency of the process in comparison to other processes.

Figure 7:
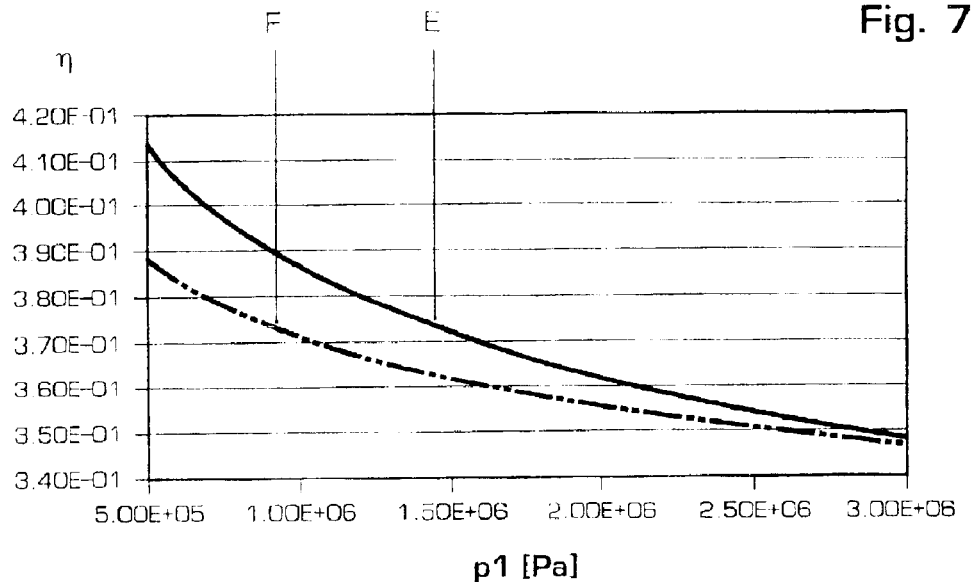
FIG. 7 shows the influence on the efficiency of the gas turbine process for isentropic intermediate cooling with different water concentrations.

FIG. 7 shows the influence of the water concentration for an isentropic intermediate cooling on the efficiency $\eta$ of the gas turbine cycle process; graph E shows a water concentration of 5%, graph F a water concentration of 3%. It can be clearly seen that the efficiency $\eta$ of the gas turbine cycle process increases along with an increasing water concentration. The Brayton process is hereby exceeded by at least 8%, and the process with isobaric intermediate cooling is also clearly improved.

Figure 8:
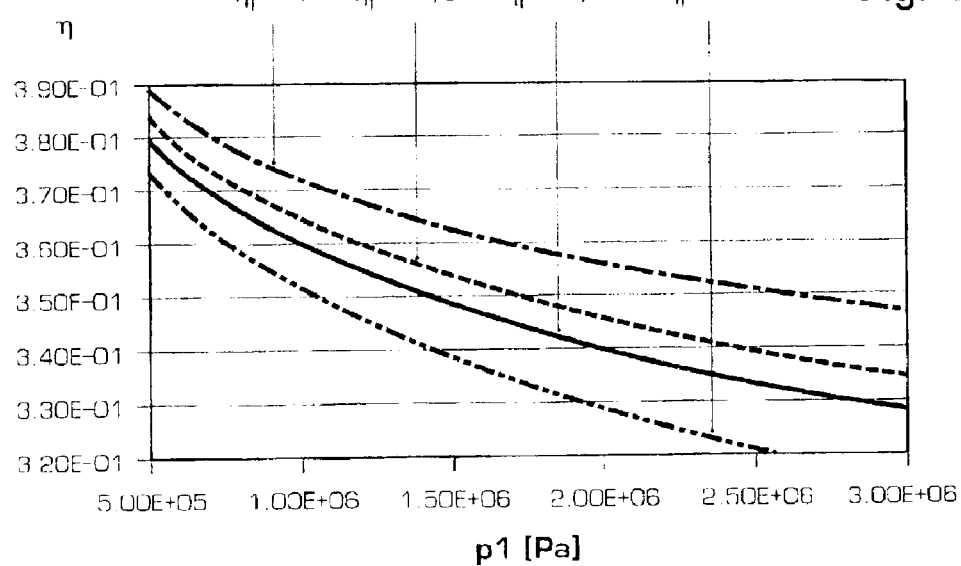
FIG. 8 shows the dependence of efficiency $\eta$ of the gas turbine cycle process from approximation of ideal isentropic intermediate cooling.

FIG. 8 shows the dependence of efficiency $\eta$ of the gas turbine cycle process from approximation of ideal isentropic intermediate cooling. For calculation, it was assumed that the change of entropy for an isobaric intermediate cooling is $\Delta S_P$. In the actually encountered case of an isentropic intermediate cooling, the entropy changes by $\Delta S_R = (1 - \eta_I) \Delta S_P$, whereby $0 \leq \eta_I \leq 1$. The case $\eta_I = 0$ corresponds to the isobaric intermediate cooling, the case $\eta_I = 1$ corresponds to the isentropic intermediate cooling, since then $\Delta S_R = 0$. The parameter $\eta_I$ therefore stands for the value of the intermediate cooling process and can be called the efficiency of the intermediate cooling. This shows that even with low efficiency values of the intermediate cooling $\eta_I$, a clearly higher efficiency is achieved than with the isobaric intermediate cooling with $\eta_I = 0$.-

Figure 9:
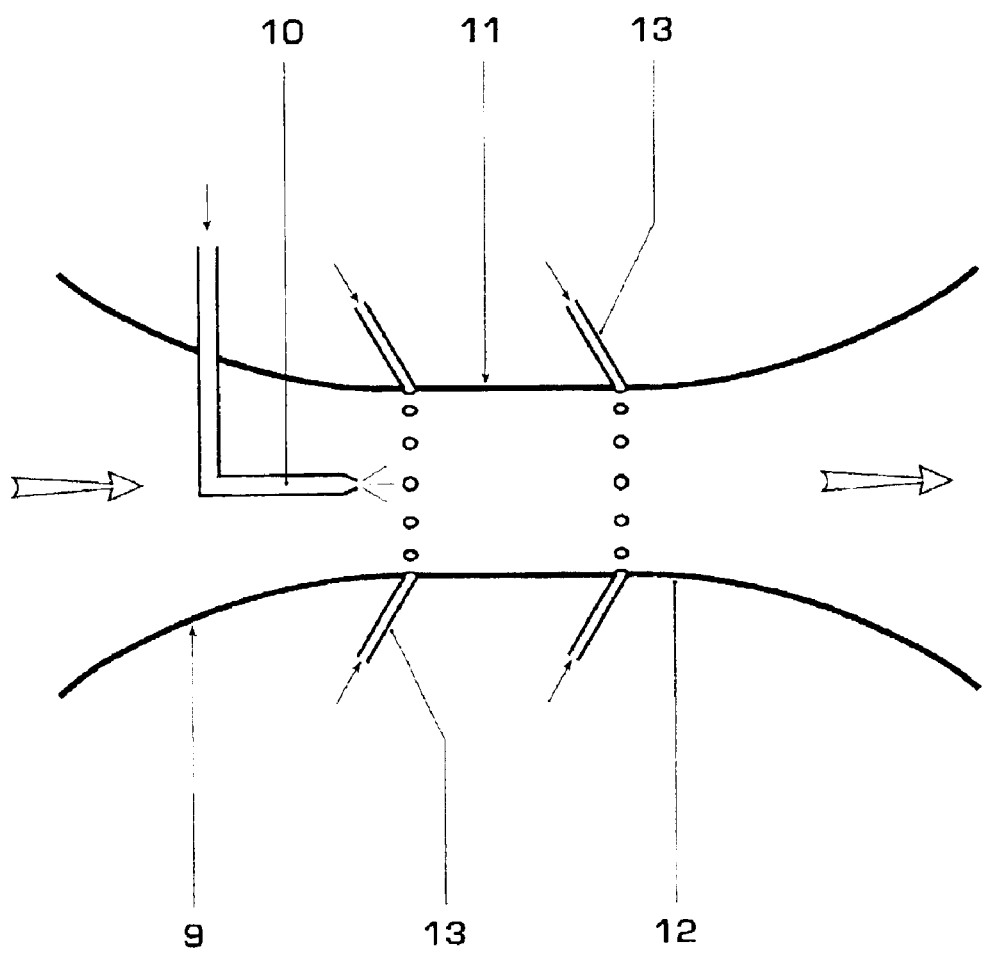
FIG. 9 shows a schematic diagram of the isentropic intermediate cooling.
Figure 10:
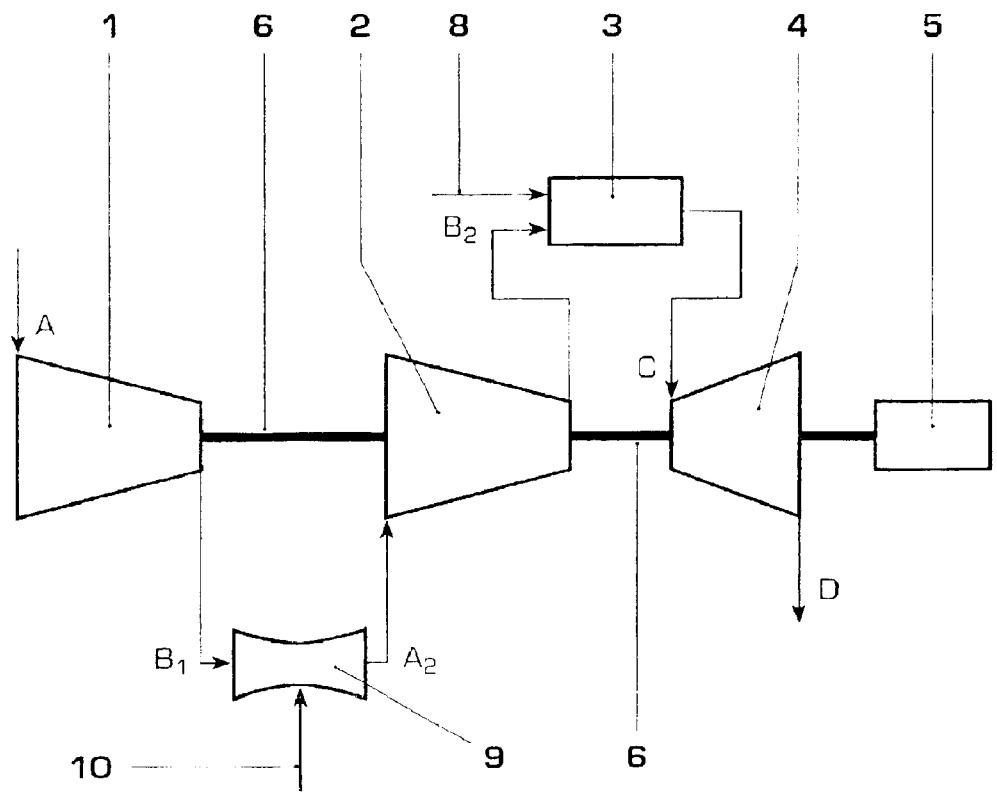
FIG. 10 shows a gas turbine system according to the invention with isentropic intermediate cooling.

The above analyzed thermodynamic process of the isentropic intermediate cooling can be technically realized using the device shown in FIGS. 9 and 10. The gas turbine system corresponds essentially to the one described in FIG. 1. The intermediate cooling used there is replaced with a nozzle-shaped intermediate cooler 9 as shown schematically in FIG. 9. The compressed air entering from the first compressor is accelerated through a constriction 11 of the nozzle-shaped intermediate cooler, and the pressure is increased. After the constriction 11, the cross-section of the nozzle 9 increases again, so that in essence the same mach value as prior to the entrance into the nozzle is achieved. In the area of the constriction, water may be injected 10 via a line directly into the inside. However, the water also may be injected via water injection nozzles 13 arranged laterally on the inside wall 12 of the nozzle-shaped intermediate cooling. Not shown as a further embodiment is the design of the intermediate cooling 9 that toroidally encloses the shaft 6.

The nozzle-shaped intermediate cooler 9 may be designed according to the following aspects:

According to fluid mechanics, the ram pressure of the flow subjected to cooling can be described by $$\frac{dp_T}{dt} = -\frac{\gamma M^2}{2} \frac{p_T \dot{q}}{H_0 \left[1 + \frac{M^2}{2}(\gamma - 1)\right]}$$

whereby $P_T$ is the ram pressure, M is the mach value, $H_0$ the thermal enthalpy, and q the cooling rate. To achieve the largest possible gain in pressure, the mach value therefore must be selected as high as possible. It was found in studies that, for example, the mach value in the constriction 11 must be in the range from 0.7 to 0.9 if the mach value is approximately 0.3 at the entrance into and exit from the nozzle-shaped intermediate cooler. This means the nozzle 9 must be designed so that high mach values can be achieved in the area of the constriction. The mach value at the exit of the nozzle may be set as desired and depends on the desired conditions at the entrance into the second compressor 2.

Naturally, this invention is not limited to the shown and described exemplary embodiment. The isentropic intermediate cooling also may be realized in a different way than shown; what is essential is the thermodynamic effect.

| List of Reference Numerals | |
|---|---|
| 1 | first compressor |
| 2 | second compressor |
| 3 | combustion chamber |
| 4 | turbine |
| 5 | generator |
| 6 | shaft |
| 7 | intermediate cooler |
| 8 | fuel |
| 9 | nozzle-shaped intermediate cooler |
| 10 | water injection |
| 11 | constriction |
| 12 | inside wall |
| 13 | water injection |

What is claimed is:

1. A method for intermediate cooling during compression of a gas turbine system, wherein the gas turbine system comprises at least one first and one second compressor, a combustion chamber, and a turbine, and wherein at least one intermediate cooler is located between the first and the second compressor, the method comprising:

at least in part isentropically intermediate cooling; and wherein the cooling in the intermediate cooler takes place in an area where the medium to be cooled has a higher mach value than prior to the entrance into the intermediate cooler.

2. A method for intermediate cooling according to claim 1, further comprising:

selecting an efficiency of the intermediate cooling $\eta_1$ greater than 0.5.

3. A method for intermediate cooling according to claim 1, wherein at least in part isentropically intermediate cooling comprises mostly isentropically intermediate cooling.

4. A method for intermediate cooling according to claim 1, further comprising:

reducing the mach value of the medium to be cooled prior to the entrance into the second compressor.

5. A method for intermediate cooling according to claim 1, wherein the cooling comprises injecting water as a cooling medium.

6. A method for intermediate cooling during compression of a gas turbine system, wherein the gas turbine system comprises at least one first and one second compressor, a combustion chamber, and a turbine, and wherein at least one intermediate cooler is located between the first and the second compressor, the method comprising:

at least in part isentropically intermediate cooling; and injecting a cooling medium in the intermediate cooler in an area where the medium to be cooled has a higher mach value than prior to the entrance into the intermediate cooler.

7. A method for intermediate cooling according to claim 6, further comprising:

reducing the mach value of the medium to be cooled prior to the entrance into the second compressor.

8. A method for intermediate cooling according to claim 6, wherein the injecting comprises injecting water as the cooling medium.

9. A method for intermediate cooling according to claim 6, further comprising:

selecting an efficiency of the intermediate cooling $\eta_1$ greater than 0.5.

10. A method for intermediate cooling according to claim 6, wherein at least in part isentropically intermediate cooling comprises mostly isentropically intermediate cooling.

* * * * *